United States Patent
Bonn

(10) Patent No.: US 6,679,655 B2
(45) Date of Patent: Jan. 20, 2004

(54) PERMAFROST SUPPORT SYSTEM AND METHOD FOR VACUUM-INSULATED PIPE

(75) Inventor: John W. Bonn, Hilliard, OH (US)

(73) Assignee: Chart Inc., Mayfield Heights, OH (US)

( * ) Notice: Subject to any disclaimer, the term of this patent is extended or adjusted under 35 U.S.C. 154(b) by 57 days.

(21) Appl. No.: 09/992,906

(22) Filed: Nov. 16, 2001

(65) Prior Publication Data

US 2002/0085885 A1 Jul. 4, 2002

Related U.S. Application Data

(60) Provisional application No. 60/249,073, filed on Nov. 16, 2000.

(51) Int. Cl.[7] ............... F16L 3/00; F28D 1/00
(52) U.S. Cl. ............ 405/184.4; 405/157; 405/159; 405/130; 165/45; 165/67; 165/104.24
(58) Field of Search ............... 405/130, 157, 405/159, 172, 154.1, 184.4, 184.5; 248/49, 65, 903, 904, 45, 47; 285/123.5, 904; 165/67, 45, 104.11, 104.24, 104.26, 134.1, 135; 138/113–117, 149

(56) References Cited

U.S. PATENT DOCUMENTS

| | | | | |
|---|---|---|---|---|
| 3,000,433 A | * | 9/1961 | Kemper | 138/149 |
| 3,563,503 A | * | 2/1971 | Lancaster | 248/49 |
| 3,568,455 A | * | 3/1971 | McLaughlin et al. | 405/184.4 |
| 3,809,149 A | * | 5/1974 | Deutch | 165/45 |
| 3,941,159 A | * | 3/1976 | Toll | 138/147 |
| 3,952,798 A | * | 4/1976 | Jacobson et al. | 165/104.26 |
| 4,553,879 A | * | 11/1985 | Langner | 405/157 X |
| 4,676,695 A | * | 6/1987 | Duthweiler | 405/157 |
| 4,826,111 A | * | 5/1989 | Ismert | 405/172 X |
| 5,020,481 A | * | 6/1991 | Nelson | 138/149 |
| 5,119,886 A | * | 6/1992 | Fletcher et al. | 165/89 |
| 5,261,555 A | * | 11/1993 | Rogers et al. | 138/149 |
| 5,390,961 A | * | 2/1995 | Gutherie | 285/41 |
| 5,553,975 A | * | 9/1996 | Elkins | 405/184.4 |
| 5,803,161 A | * | 9/1998 | Wahle et al. | 165/45 X |
| 5,871,306 A | * | 2/1999 | Tilcox | 405/157 |
| 6,134,893 A | * | 10/2000 | Bonn | 285/904 X |
| 6,206,613 B1 | * | 3/2001 | Elkins | 405/157 |
| 6,318,681 B1 | * | 11/2001 | Vitoorapakorn | 138/149 |

FOREIGN PATENT DOCUMENTS

| | | | | |
|---|---|---|---|---|
| JP | 57058095 | * | 4/1982 | 165/67 |

OTHER PUBLICATIONS

Publication: The Trans–Alaska.

* cited by examiner

Primary Examiner—Jong-Suk (James) Lee
(74) Attorney, Agent, or Firm—Calfee, Halter & Griswold, LLP

(57) ABSTRACT

A system for supporting pipe within soil or fill material which minimizes positional disturbances of the pipe despite seasonal fluctuations in atmospheric temperature is provided. The system provides a length of double walled pipe, a support member placed in the soil or fill material and a wicking device which transfers energy between the inner pipe of the double walled pipe which is typically full of a cryogenic fluid and the support. The energy transfer stabilizes the soil or fill material, typically by freezing.

17 Claims, 3 Drawing Sheets

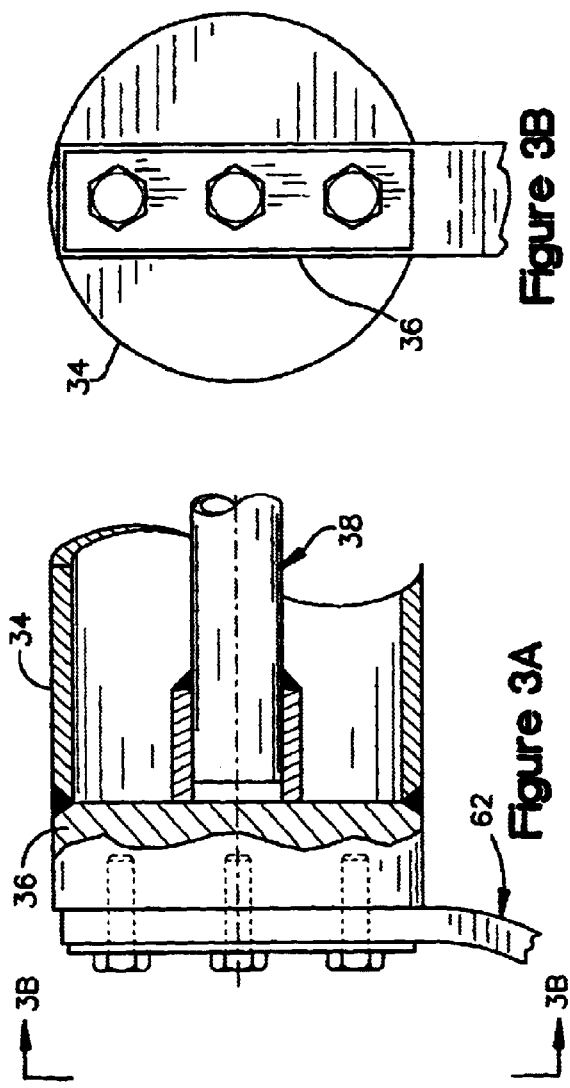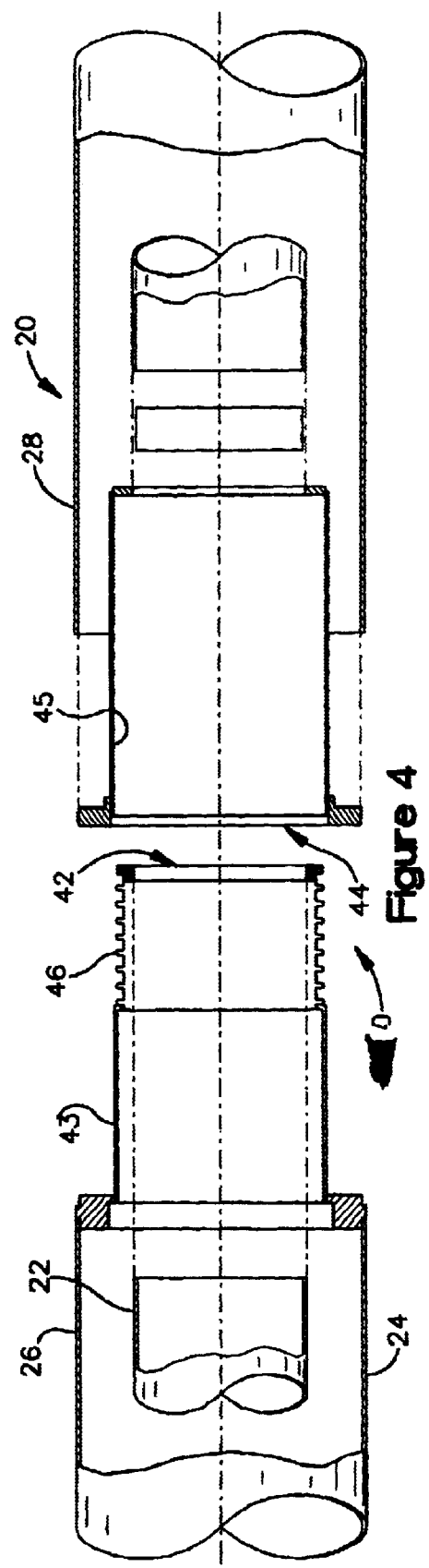

US 6,679,655 B2

PERMAFROST SUPPORT SYSTEM AND METHOD FOR VACUUM-INSULATED PIPE

PRIORITY CLAIM

This application claims the benefit of U.S. provisional patent application No. 60/249,073 filed on Nov. 16, 2000, the entirety of which is hereby incorporated by reference.

FIELD OF THE INVENTION

This invention relates to pipelines and their associated support systems and more particularly systems utilizing temperature control of the soil or fill material surrounding the support system.

BACKGROUND OF THE INVENTION

Maintaining the integrity of pipelines laid above or within soil or fill is often dependent upon the fluctuations within the soil or fill. Apart from cataclysmic disturbances such as earthquakes and floods, fill or soil fluctuations are caused by soil temperature changes. Temperature of the soil and more importantly periodic temperature variations caused by the change of seasons affect the support characteristics of the soil or fill. Expansion and contraction occurs as well as changes in moisture content. Variations are amplified in non-stable soil types, namely permafrost which is prevalent in northern regions such as Alaska.

Although it can be difficult to prevent or protect against cataclysmic events, it is possible to maintain the temperature of soil or fill material supporting a pipeline within a range where the soil or fill material is stabilized, typically in a frozen condition. What is desired is a simple and efficient way to stabilize soil or fill material beneath a pipe or pipeline.

SUMMARY OF THE INVENTION

The present invention overcomes disadvantages in existing support systems by providing a system which stabilizes the soil or fill material surrounding a pipeline support. The invention provides in one aspect a system for supporting pipe within soil or fill material which minimizes positional disturbances of the pipe despite seasonal fluctuations in atmospheric temperature. The system includes a length of double walled pipe including an inner pipe and an outer pipe, a support member which supports said double walled pipe and is placed in soil or fill material, and a wicking device which transfers energy between the inner pipe and the support member. Thus, energy is further transferred between the support member and the soil or fill material adjacent the support member to stabilize the soil or fill material.

The invention provides in another aspect a system including a length of double walled pipe including an inner pipe and an outer pipe, a support member which supports the double walled pipe and is placed in soil or fill material, a pipe stem extending from the outer pipe, and a wicking device which transfers energy between said inner pipe and said support, through the pipe stem. This variation is useful in instances where the support member is positionally offset from the point in the double walled pipe where energy is transferred from the inner pipe to the outer pipe.

The system provides an efficient method of supporting vacuum-insulated cryogenic piping installed in permafrost or other soils that have low bearing load properties. The consistency of the soil, when frozen, can sustain the load required to support the piping. A cryogenic material within the innermost pipe provides the necessary refrigeration to freeze the permafrost, or other soil, around the support structure. The invention is an improvement over existing support systems in that the most unpredictable variable in the system, soil condition, is stabilized by cooling or freezing. The superior wicking design within the system of the invention allows the system to be sized to provide just the right amount of refrigeration necessary to freeze the soil or fill material without wasting excess energy and increasing amount of refrigeration needed. These and other aspects of the invention are herein described in particularized detail with reference to the accompanying Figures.

BRIEF DESCRIPTION OF THE DRAWINGS

FIG. 3A is a close up side view of a conducting strap within the embodiment of FIG.

FIG. 3B is a close up end view of a conducting strap within the embodiment of FIG. 3; and FIG. 4 is a side-sectional view of the double walled pipe of the support system embodiment of FIG. 2.

DETAILED DESCRIPTION OF PREFERRED AND ALTERNATE EMBODIMENTS OF THE INVENTION

Figure 1:
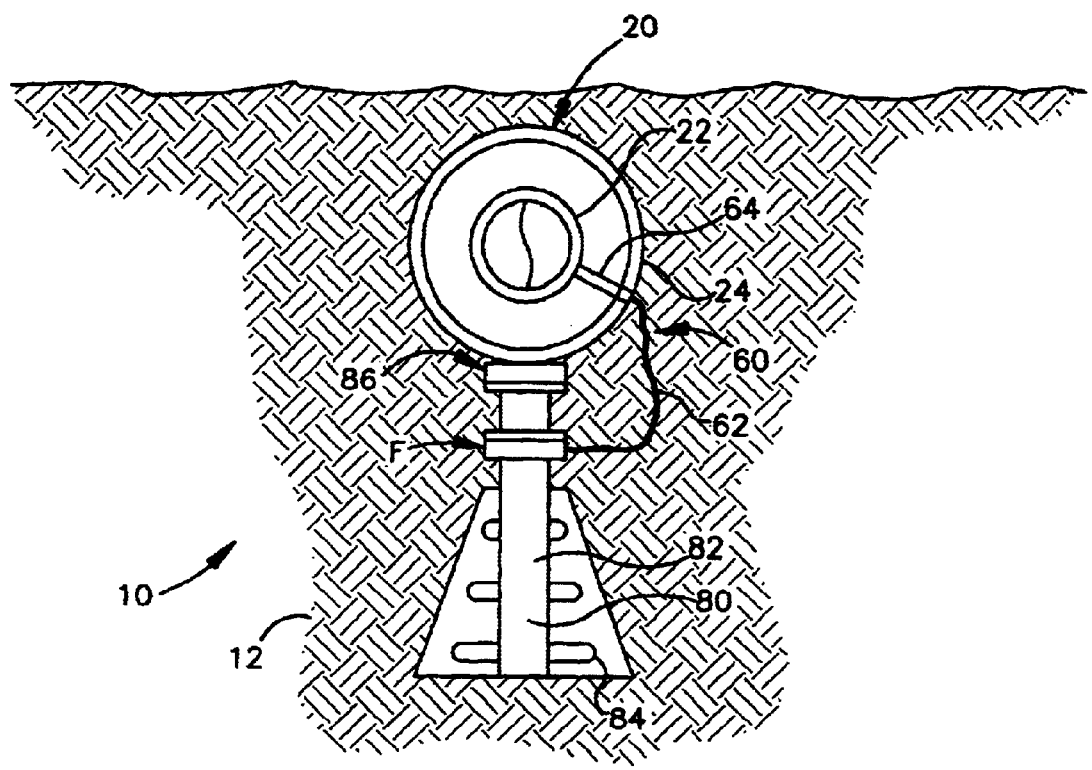
FIG. 1 is an end-sectional view of a first embodiment of the support system.

Referring to the drawings, FIG. 1 illustrates a support system 10 according to the invention. The support system 10 is used within any type of soil or fill material 12, but is especially effective within permafrost. The support system 10, as described in more detail below, comprises a length of double walled pipe 20 (including an inner pipe 22 and an outer pipe 24), a support member 80, and a wicking device 60 which transfers energy from the inner pipe 22 to the support member 80 and eventually into the soil or fill material 12 or in the reverse manner, from the soil 12 to the inner pipe 22. The energy transferred from the double walled pipe 20 to the soil or fill material 12 is heat energy. Thus, when the temperature of the inner pipe 22 is lower than the soil or fill material 12, which is a desired condition, heat is withdrawn from the soil or fill material 12. When the temperature of the inner pipe 22 exceeds that of the soil or fill material 12, typically when the inner pipe 22 is empty, heat energy is transferred to the soil or fill material 12.

Heat is transferred in a gradual wicking manner. Thus, when heat is taken from the soil or fill material 12, the amount is small enough to avoid significant refrigeration loss within the inner pipe 22. And when heat is transferred to the soil or fill material 12, such as in an empty pipe condition, the rate is not so fast that the soil or fill material 12, if frozen, thaws. In a preferred embodiment of the invention the entire support system 10 including the double walled pipe 20 is buried within the soil or fill material. Alternatively, the double walled pipe 20 is above ground while the support member 80 is either partially or completely buried (not shown).

Figure 2:
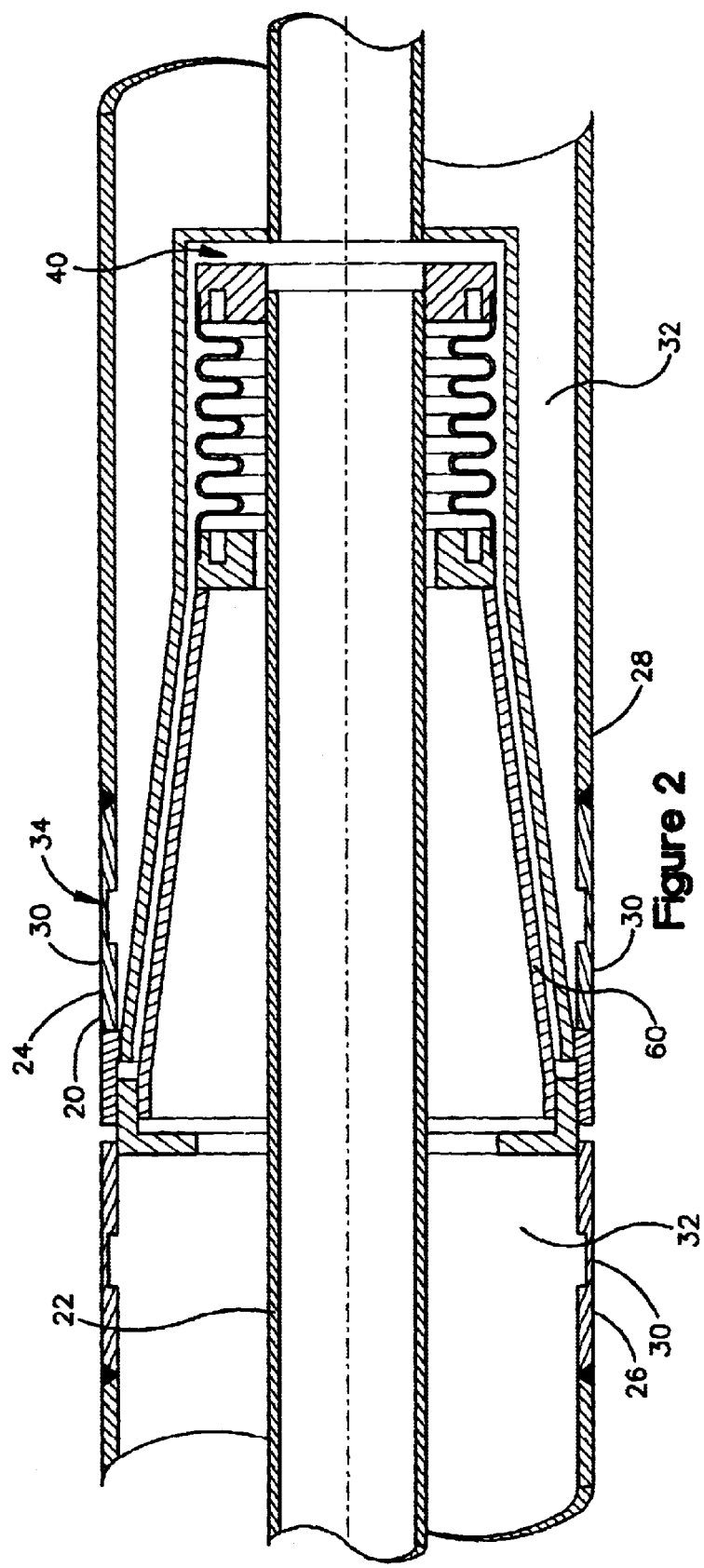
FIG. 2 is a side-sectional view of the double walled pipe of an alternate embodiment of the support system.

Referring to FIG. 2, the length of double walled pipe 20 may be part of a short run or an extensive pipeline such as pipeline running from Prudhoe Bay to Valdez, Ak. The length of pipe 20 may be formed from two or more sections, or spools 26 and 28, which are joined together using methods known in the art such as welding. The pipe 20 is double walled because it is formed from an inner pipe 22 (first wall) surrounded by a second pipe 24 (second wall) of a larger diameter. The inner pipe 22 is used to facilitate the transfer of a liquid, slurry or gas. In an embodiment of the invention the inner pipe 22 is used to facilitate the transfer of a cryogenic liquid such as liquid natural gas (LNG). The transfer of a liquid often is more economical than that of a gas. Gas transfer requires extensive compression, larger diameter transfer pipe, and increased pumping pressures. The inner pipe 22 is formed from 304 stainless steel or other materials where are amenable to carrying cryogenic materials.

The outer pipe 24 is formed predominantly from carbon steel. However areas, or nipples 30, of more conductive material are included along the length of the outer pipe 24 as described in more detail below. The interspace 32 between the inner pipe 22 and the outer pipe 24 functions as an insulator. In an embodiment of the invention, the interspace 32 is a vacuum. Alternatively, the interspace 32 may contain common insulating materials such as mineral wool, foam, paper, or a combination of aluminized Mylar® with alternate layers of Dextar-type insulating material. The interspace 32 also provides room for a bayonet assembly 40 of the wicking device 60 which functions as a conductive heat transfer device between the inner pipe 22 and the outer pipe 24 of the double walled pipe length 20.

22 portion of the first spool 26. The female bayonet 44 is attached to the adjacent pipe spool 28 and accepts entry of the male bayonet 42, including the bellows 46, with a tight fit. As a result, when the adjacent pipe spools 26 and 28 are attached at their outer pipe 24 sections using methods known in the art, the bayonet joint of the inner pipe 22 allows expansion and contraction of the inner pipe 22 without the use of a pipe loop and while keeping the inner pipe 22 straight. The internal sealing surface 45 of the female bayonet 44 and the sealing mating surface 43 of the male bayonet 42 are formed from a conductive material such as stainless steel. This allows energy to be transferred easily from the inner pipe 22 to the outer pipe 24. The internal sealing surfaces 43 and 45 of the male and female bayonets 42 and 44 respectively conduct energy from the inner pipe 22 to the outer pipe 24.

In another embodiment of the invention, shown in FIG. 1, a simple conductor 64 is used to transfer energy from the inner pipe 22 to the outer pipe 24. The conductor 22 may be in the shape of a rod which contacts the inner pipe 22. The conductor 22 may be made of any conductive material such as copper or aluminum. A table of the preferred heat transfer rate (in BTU/hr) for the conductor 64 as well as the conducting extension, described in detail below, is shown here.

| Dia. Inches | Area Feet | Conductor Length. In Feet | | | | | | | |
|---|---|---|---|---|---|---|---|---|---|
| | | 0.500 | 0.583 | 0.667 | 0.750 | 0.833 | 0.917 | 1.000 | 1.083 |
| 0.500 | 0.001 | 164 | 141 | 123 | 110 | 99 | 90 | 82 | 76 |
| 0.625 | 0.002 | 257 | 220 | 193 | 171 | 154 | 140 | 128 | 118 |
| 0.750 | 0.003 | 370 | 317 | 277 | 246 | 222 | 202 | 185 | 171 |
| 0.813 | 0.004 | 434 | 372 | 325 | 289 | 260 | 237 | 217 | 200 |
| 0.938 | 0.005 | 578 | 495 | 433 | 385 | 346 | 315 | 289 | 267 |
| 1.000 | 0.005 | 658 | 563 | 493 | 438 | 394 | 358 | 329 | 303 |
| 1.125 | 0.007 | 833 | 713 | 624 | 554 | 499 | 454 | 416 | 384 |
| 1.250 | 0.009 | 1028 | 880 | 770 | 684 | 616 | 560 | 513 | 474 |
| 1.313 | 0.009 | 1133 | 970 | 849 | 755 | 679 | 617 | 566 | 522 |
| 1.438 | 0.011 | 1360 | 1164 | 1018 | 905 | 815 | 741 | 679 | 627 |
| 1.500 | 0.012 | 1480 | 1267 | 1109 | 986 | 887 | 806 | 739 | 682 |
| 1.625 | 0.014 | 1738 | 1487 | 1301 | 1157 | 1041 | 946 | 867 | 801 |
| 1.750 | 0.017 | 2015 | 1725 | 1509 | 1341 | 1207 | 1098 | 1006 | 929 |
| 1.813 | 0.018 | 2162 | 1850 | 1619 | 1439 | 1295 | 1177 | 1079 | 996 |
| 1.938 | 0.020 | 2470 | 2114 | 1850 | 1644 | 1480 | 1345 | 1233 | 1138 |
| 2.000 | 0.022 | 2632 | 2253 | 1971 | 1752 | 1577 | 1433 | 1314 | 1213 |

Referring back to FIG. 1, a wicking device 60 is shown which is used to transfer energy from the inner pipe 22 to the support member 80. In differing embodiments of the invention, the wicking device 60 comprises different elements.

In an embodiment of the invention, shown in FIG. 4, the wicking device includes a bayonet assembly 40 which transfers energy from the inner pipe 22 to the outer pipe 24. The bayonet assembly 40 is described in detail in PCT Application No. US00/28303 which is fully incorporated by reference. In summary, the bayonet assembly 40 comprises a male bayonet 42 and a female bayonet 44 and is located at the joint of adjacent pipe spools 26 and 28. The pipe spools 26 and 28, when connected, form a length of pipe 20 which is part of an overall pipeline. The male bayonet 42 attached to the end of a first pipe spool 26 includes peripheral, metal, expansion-contraction bellows 46 secured to the inner pipe Within an embodiment of the wicking device 60 where the device is located at a joint between adjacent pipe spools as shown in FIG. 2, modifications may be made to the spools to enhance heat transfer. The outer pipe 24 of each spool 26 and 28 may modified at an end where connection to an adjacent spool 26 and 28 is made. At this end, a nipple 30 of material, such stainless steel, which is compatible with cryogenic fluids takes the place of the carbon steel. This nipple 30 is attached to the carbon steel section of the outer pipe 28 on each spool. The length of the nipple 30 is approximately 24 inches. A section 34 of the nipple 30 has a reduced diameter in order to reduce heat transfer to the carbon steel section of the outer pipe 24 and to concentrate heat transfer from the nipple 30 close to the joint between the nipple 30 on one spool 26 and an adjacent spool 28. The end of the nipple 30 opposite the end attached to the carbon steel section of the outer pipe 24 is connected to an adjacent pipe spool in the field by welding or by a flange connection.

Figure 3:
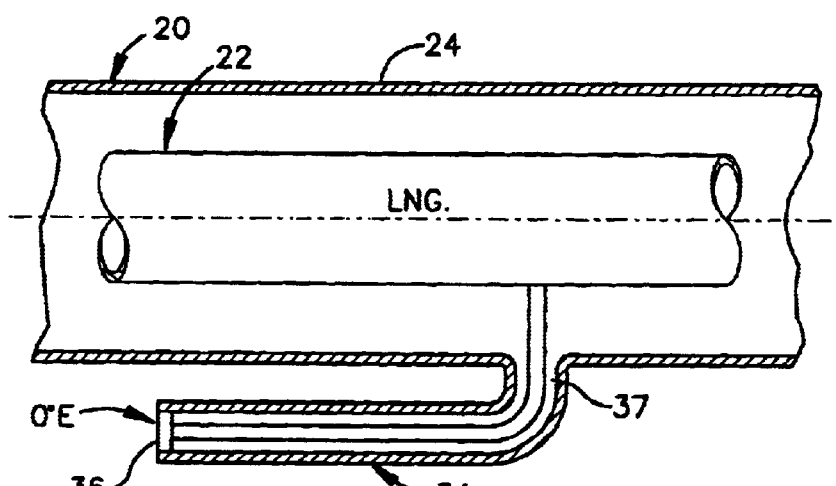
FIG. 3 is a side sectional view of yet another embodiment of the invention.

In an alternate embodiment of the invention shown in FIG. 3, a support member 80 is in a position offset from the point where energy is transferred between the inner and outer pipes 22 and 24. Often this is a situation where at the support position there is no joint in the length of double walled pipe 20 (no adjoining pipe spools) and thus no bayonet assembly. This may also be a situation where, although there is no offset joint in the pipe line, it is preferable, for maintenance reasons, to have the point of passage between the inner and outer pipes 22 and 24 offset from the position of the support. In this embodiment, a pipe stem 34 is extended off of the outer pipe 24 of the length of pipe 20. The pipe stem 34 is hollow and may be formed from a conductive or a non-conductive material. The pipe stem 34 may extend parallel to the pipe length 20 or may point in a downward direction. The pipe stem 34 is closed at its end which is not attached to the pipe length 20. The closure 36 is made from conductive material. The closure 36 includes means for attaching conductive straps as shown in FIGS. 3A and 3B which lead to a support member within the soil or fill material. The hollow space 37 of the pipe stem 34 includes both a conducting extension 38 and means of insulation. The conducting extension 38 is a length of conducting metal such as copper or aluminum. The insulation is the same as is within the length of pipe 20, typically a vacuum.

Referring back to FIG. 1 as well as FIGS. 3A and 3B, in addition to the bayonet assembly 40 the wicking device 60 also comprises one or more conductive straps 62. The conductive straps 62 lead from the outer pipe 24 to the support 80. In one embodiment of the invention, one end of the straps 62 is attached to the exterior surface of the outer pipe 24 at the stainless steel nipple 30. In the embodiment of the invention including the pipe stem 34, the conductive straps 62 attach to the closure 36 at the end of the pipe stem 34. The opposite end of the straps is attached to the support member 80. The conductive straps 62 are sized in sized in response to the amount of heat transfer required. Heat transfer rates are comparable to those shown in Table 1. The straps 62 are formed from a heat conductive material such as copper or aluminum.

Referring to FIG. 1, the support member 80 has a shape which is larger at the bottom than at the top. The support member 80 includes a central support rod 82. This support rod 82 is oriented vertically. One or more expanded surfaces 84 are attached to the central support rod 82. The expanded surfaces 84 are shaped with a wider base and a more narrow upper section. The wider base provides superior support properties. The amount of surface area of the expanded surfaces 84 is determined by the amount of energy transfer desired between the support member 82 and the soil or fill material 12. The expanded surfaces 84 are attached to the central support rod 82 by welding or other means known in the art. The central support rod 82 and expanded surfaces 84 are made from conductive materials such as copper or aluminum. The support member 80 has a dual function, first supporting the length of pipe 20 and second acting as an energy transfer device between the conducting straps 62 and the soil or fill material 12.

The support member 80 is located below the outer pipe 24 of the pipeline. Between the support member 80 and the outer pipe 24 is an insulating spacer 86. The insulating spacer 86 has a saddle shaped top surface which is in contact with the curved surface of the outer pipe 24. The insulating spacer 86 has a flat bottom surface which is in contact with the support member 80. The insulating spacer 86 is made from polyethylene or other insulating materials. The insulating spacer 86 serves as a barrier against energy transfer between the outer pipe 24 and the support member 80. The insulating spacer 86 is sized to completely cover the top surface of the support member 80 so there is no contact between the support member 80 and the outer pipe 24.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A system for supporting pipe within soil or fill material which minimizes positional disturbances of the pipe despite seasonal fluctuations in atmospheric temperature comprising:

a length of double walled pipe including an inner pipe and an outer pipe and an interspace between said inner pipe and said outer pipe, said interspace including an energy insulator;

a support member which supports said double walled pipe and is placed in soil or fill material; and a wicking device which transfers energy between said inner pipe and said support member by means of an energy conducting member at a rate which exceeds the rate of energy transfer through said interspace between said inner pipe and said outer pipe, whereby energy is further transferred between said support member and said soil or fill material adjacent said support member to stabilize said soil or fill material.

2. The system of claim 1 wherein a vacuum is said energy insulator within said interspace.

3. The system of claim 1 wherein said length of double walled pipe comprises a first and second spool attached together.

4. The system of claim 1 wherein said support member comprises a solid central rod attached to one or more expanded surfaces.

5. The system of claim 1 wherein said support member has a top and a base wherein said base has a greater width than said top.

6. A system for supporting pipe within soil or fill material which minimizes positional disturbances of the pipe despite seasonal fluctuations in atmospheric temperature comprising:

a length of double walled pipe comprising a first and second pipe spool attached together each including an inner pipe and an outer pipe;

a support member which supports said double walled pipe and is placed in soil or fill material; and a wicking device comprising a bayonet assembly which transfers energy from said inner pipe to said outer pipe and one or more straps which transfer energy from said outer pipe to said support member, whereby energy is further transferred between said support member and said soil or fill material adjacent said support member to stabilize said soil or fill material.

7. The system of claim 6 herein said bayonet assembly comprises a male bayonet on said first pipe spool and a female bayonet on said second pipe spool.

8. The system of claim 7 wherein said first pipe spool and said second pipe spool each include a nipple made of conducting material.

9. A system for supporting pipe within soil or fill material which minimizes positional disturbances of the pipe despite seasonal fluctuations in atmospheric temperature comprising:

a length of double walled pipe including an inner pipe and an outer pipe;

a support member which supports said double walled pipe and is placed in soil or fill material;

a wicking device which transfers energy between said inner pipe and said support member, whereby energy is further transferred between said support member and said soil or fill material adjacent said support member to stabilize said soil or fill material; and a thermal insulating support device located between said outer pipe and said support member to minimize energy transfer therebetween.

10. A system for supporting pipe within soil or fill material which minimizes positional disturbances of the pipe despite seasonal fluctuations in atmospheric temperature comprising:

a length of double walled pipe including an inner pipe and an outer pipe;

a support member which supports said double walled pipe and is placed in soil or fill material; and a wicking device comprising
a conductor which transfers energy from said inner pipe to said outer pipe and one or more straps which transfer energy from said outer pipe to said support member whereby energy is further transferred between said support member and said soil or fill material adjacent said support member to stabilize said soil or fill material.

11. A system for supporting pipe within soil or fill material which minimizes positional disturbances of the pipe despite seasonal fluctuations in atmospheric temperature comprising:

a length of double walled pipe including an inner pipe and an outer pipe;

a support member which supports said double walled pipe and is placed in soil or fill material; and a wicking device which transfers energy between said inner pipe and said support member said wicking device including a bayonet assembly for transferring energy between said inner pipe and said outer pipe, whereby energy is further transferred between said support member and said soil or fill material adjacent said support member to stabilize said soil or fill material.

12. A system for supporting pipe within soil or fill material which minimizes positional disturbances of the pipe despite seasonal fluctuations in atmospheric temperature comprising:

a length of double walled pipe including an inner pipe and an outer pipe;

a support member which supports said double walled pipe and is placed in soil or fill material; and a wicking device which transfers energy between said inner pipe and said support member, said wicking device including a conductive rod extending from said inner pipe to said outer pipe whereby energy is further transferred between said support member and said soil or fill material adjacent said support member to stabilize said soil or fill material.

13. A system for supporting pipe within soil or fill material which minimizes positional disturbances of the pipe despite seasonal fluctuations in atmospheric temperature comprising:

a length of double walled pipe including an inner pipe and an outer pipe;

a support member which supports said double walled pipe and is placed in soil or fill material;

a pipe stem extending from said outer pipe; and a wicking device which transfers energy between said inner pipe and said support member through said pipe stem, said wicking device including an energy conducting extension attached to said inner pipe, running through said pipe stem and attaching to a closure upon said pipe stem, whereby energy is further transferred between said support meter and said soil or fill material adjacent said support member to stabilize said soil or fill material.

14. The support system of claim 13 wherein said wicking device includes conductive straps attached to said support member and said closure upon said pipe stem.

15. A method of stabilizing the soil or fill material beneath a pipeline comprising the steps of:

a. placing a support member into a soil or fill material having an ambient temperature;

b. supporting a length of double walled pipe, having an inner pipe and an outer pipe and an interspace including an energy insulator therebetween, upon said support member;

c. placing a fluid having an ambient temperature below the ambient temperature of said soil or fill material into said inner pipe; and d. using a wicking device, transferring heat energy from soil or fill material to said inner pipe by means of an energy conducting member wherein the rate of energy transfer through the wicking device exceeds the rate through the energy insulator, dropping the temperature of said soil or fill material to a degree necessary to freeze said soil or fill material.

16. A system for supporting fluid carrying pipe within soil or fill material wherein the temperature of the fluid within the pipe is below that of the soil or fill material, the system minimizing positional disturbances of the pipe despite seasonal fluctuations in atmospheric temperature comprising:

a length of double walled pipe including an inner pipe and an outer pipe and an interspace between said inner pipe and said outer pipe, said interspace including an energy insulator, said pipe suitable for carrying a cryogenic fluid;

a support member adjacent and below said double walled pipe which supports said double walled pipe and is placed in soil or fill material; and a wicking device which transfers energy between said inner pipe and said support member by means of an energy conducting member at a rate which exceeds the rate of energy transfer through said interspace between said inner pipe and said outer pipe, whereby heat energy is transferred from the soil or fill material adjacent said support member to the support member then to said inner pipe thereby maintaining said soil or fill material adjacent the system in a frozen or semi-frozen state.

17. A system for supporting pipe within soil or fill material which minimizes positional disturbances of the pipe despite seasonal fluctuations in atmospheric temperature comprising:

a length of double walled pipe including an inner pipe and an outer pipe and an interspace between said inner pipe and said outer pipe, said interspace including an energy insulator;

a support member adjacent and below said double walled pipe which supports said double walled pipe and is placed in soil or fill material; and a wicking device which transfers energy between said inner pipe and said support member by means of an energy conducting member at a rate which exceeds the rate of energy transfer through said interspace between said inner pipe and said outer pipe, whereby energy is further transferred between said support member and said soil or fill material adjacent said support member to stabilize said soil or fill material adjacent the system.

* * * * *